United States Patent [19]
Iimura

[11] Patent Number: 6,108,476
[45] Date of Patent: Aug. 22, 2000

[54] OPTICAL FIBER WITH PHOTOCATALYST AND METHOD FOR ACTIVATING THE SAME

[76] Inventor: Keiji Iimura, 10-8, Akatsuka 3-Chome, Itabashi-ku, Tokyo, 175, Japan

[21] Appl. No.: 09/146,915

[22] Filed: Sep. 2, 1998

[30] Foreign Application Priority Data

Feb. 27, 1996 [JP] Japan ........................................ 8-80434

[51] Int. Cl.[7] ...................................................... G02B 6/02
[52] U.S. Cl. ............................. 385/128; 385/12; 385/123
[58] Field of Search ................................... 385/128, 123, 385/12, 147; 422/186.3, 186

[56] References Cited

U.S. PATENT DOCUMENTS 5,875,384  2/1999  Peill et al. ............................. 422/186.3

*Primary Examiner*—Phan T. H. Palmer

[57] ABSTRACT

The present invention discloses a novel photocatalyst optical fiber and a novel method for activating the photocatalyst optical fiber. The photocatalyst optical fiber comprises at least an optical fiber having a core and a light input end, a photocatalyst layer including photocatalyst disposed partially or entirely on the core, wherein light is introduced from the light input end into the core and the light reflects repeatedly inside of the core, wherein said light leaks gradually from the core to the photocatalyst layer, and wherein the photocatalyst layer is activated by irradiation of the light. The method for activating the photocatalyst optical fiber comprises (a) providing at least an optical fiber, each having a photocatalyst layer i.e. photocatalyst film including photocatalyst, in which the photocatalyst layer is partially or entirely disposed on the optical fiber, (b) introducing light into the optical fiber, (c) letting the light to reflect repeatedly inside of the optical fiber, and (d) letting the light to leak gradually from the optical fiber to the photocatalyst layer, whereby the photocatalyst layer is activated by irradiation of the light. Therefore, the present invention can efficiently activate the photocatalyst on the optical fiber by irradiating directly light leaked from the optical fiber.

20 Claims, 4 Drawing Sheets

DRAWINGS

OPTICAL FIBER WITH PHOTOCATALYST AND METHOD FOR ACTIVATING THE SAME

BACKGROUND OF THE INVENTION

1. Field of the Invention

The invention relates to a photocatalyst optical fiber in which the photocatalyst optical fiber has a photocatalyst.

Further, the invention relates to a method for activating the photocatalyst optical fiber.

2. Description of Related Art

It is well known that a photocatalyst is activated by irradiation of light with relatively short wave length such as ultraviolet (UV) light and the photocatalyst decomposes or dissolves a substance that is contacted, stuck or closed with the photocatalyst by reaction of oxidation and/or reduction or photocatalyst effect.

The photocatalyst is a kind of photo-activated semiconductors such as Titanium Dioxide ($TiO_2$).

There are many fields capable of applying the photocatalyst, for instance, a cleaning to delete dirty component from a surface of articles, a dirt protection to prevent sticking of a dirty component, an infection, a deleting of smell, a cleaning of air, a processing of exhausting gas, a cleaning of water, a processing of exhausting water, a dissolving of water to make Hydrogen, a speeding up of chemical reaction and a dissolving of pollutant causing social pollution.

All the applications as mentioned in the above utilize the photocatalyst reaction or photocatalyst function by strong oxidation and/or reduction power to show when the photocatalyst is activated.

For example, when the photocatalyst is irradiated by the light rays with short wave length, it activates Oxygen ($O_2$) existing in the air, Oxygen dissolving in the water or Oxygen being mixed in the water, so that an Ozone ($O_3$) or an activated Oxygen (O) generates and the Ozone or the activated Oxygen decomposes mold, bacteria and organic chlorine compound including in the water by oxidization reaction. Therefore, the smell-less and color-less water is obtained and the water is sterilized.

Furthermore, when the photocatalyst [being radiated] is irradiated by the light rays with short wave length, it accelerates to decompose i.e. resolve the water $H_2O$ to activated oxygen (O) and hydrogen ($H_2$).

Moreover, the photocatalyst as circumstance cleaning material contributes to decomposition of pollutants which gives a bad influence to a social circumstance, in which the pollutants are for example a volatile organic solvent, a chemical agent for agriculture such as grass eliminating agent i.e. insecticide, an organic phosphate and a deleterious inorganic chemical compound such as cyanide and a kind of chrome.

In case that multiple photocatalyst particles are used directly for reaction of oxidation and/or reduction with any substance, it is so difficult that the photocatalyst particles are separated and collected, and a device to utilize the photocatalyst particles becomes complicated and large.

While, in the case that multiple photocatalyst particles are used as a form of photocatalyst supported substrate in which a layer including the photocatalyst particles is fixed and supported on the substrate, the recycle use of the photocatalyst particles can be easily carried out, because the separation and collection of the photocatalyst particles are not needed.

As for the latter case using the photocatalyst supported substrate, the publication of unexamined patent application of Japan No. 155726/1993 discloses that a Titanium Dioxide layer of photocatalyst is coated on a substrate such as metal, ceramics and glass, for the purpose of protecting a surface of the substrate from growth of bacteria.

In the related art, light rays emitting from a light source are partially used for activation of photocatalyst and the object to be cleaned is irradiated indirectly by the light rays, because the object exists between the light source and the photocatalyst layer on the photocatalyst device.

Therefore, the related art has such disadvantage that an effective use is not made for the light rays emitting from the light source and a large volume of the light source with high power is required to accelerate a photocatalyst reaction in a photocatalyst reactor.

SUMMARY OF THE INVENTION

A major object of the invention is to provide novel method for activating photocatalyst, and novel device including photocatalyst.

A further major object of the present invention is to provide novel method for activating photocatalyst, and novel device including photocatalyst, in which the photocatalyst can be directly irradiated by light rays emitting from a light source.

To accomplish the object, a first aspect of the present invention is a photocatalyst optical fiber which comprises at least an optical fiber having a core and a light input end, a photocatalyst layer including photocatalyst disposed partially or entirely on the core, wherein light is introduced from the light input end into the core and the light reflects repeatedly inside of the core, wherein said light leaks gradually from the core to the photocatalyst layer, and wherein the photocatalyst layer is activated by irradiation of the light.

Further, to accomplish the object, a second aspect of the present invention is a method for activating the photocatalyst optical fiber which comprises (a) providing at least an optical fiber, each having a photocatalyst layer (i.e. photocatalyst film) including photocatalyst, in which the photocatalyst layer is partially or entirely disposed on the optical fiber, (b) introducing light into the optical fiber, (c) letting the light to reflect repeatedly inside of the optical fiber, and (d) letting the light to leak gradually from the optical fiber to the photocatalyst layer, whereby the photocatalyst layer is activated by irradiation of the light.

To accomplish the object, a third aspect of the present invention is a photocatalyst optical fiber which comprises at least an optical fiber having a core with a surface and a light input end, a photocatalyst layer disposed partially or entirely on the core and the photocatalyst layer composing of multiple photo activated semiconductor particles and an organic or inorganic binder to bind and fix the photo activated semiconductor particles on the core, wherein light is introduced from the light input end into the core and the light reflects repeatedly inside of the core, wherein the light leaks gradually from the core to the photocatalyst layer, and wherein the photocatalyst layer is activated by irradiation of the light.

To accomplish the object, a fourth aspect of the present invention is a photocatalyst optical fiber which comprises at least an optical fiber having a core with a surface and a light input end, a photocatalyst layer disposed partially or entirely on the core and the photocatalyst layer composing of photo activated Titanium Oxide film which is so manufactured that a Titania Sol coating is fired after the core is coated with the Titania Sol, wherein light is introduced from the light input end into the core and the light reflects repeatedly inside of the core, wherein the light leaks gradually from the core to the photocatalyst layer, and wherein the photocatalyst layer is activated by irradiation of the light.

That is, in the present invention, a fiber like material is formed as an optical fiber by carrying the photocatalyst corresponding to a clad of the optical fiber on the surface of a light transmission body corresponding to the core. And by irradiating directly the photocatalyst with light from the inside of the light transmission body in a photocatalyst fiber composed of the light transmission body carrying the photocatalyst, in this way, a light irradiation is efficiently executed and a photocatalytic reaction is accelerated.

Therefore, the present invention completely eliminates disadvantages of the related art.

BRIEF DESCRIPTION OF THE DRAWINGS

Complete understandings of the present invention may be obtained from the following explanations, in connection with the accompanying drawings, in which.

DESCRIPTION OF THE PREFERRED EMBODIMENTS

Figure 1:
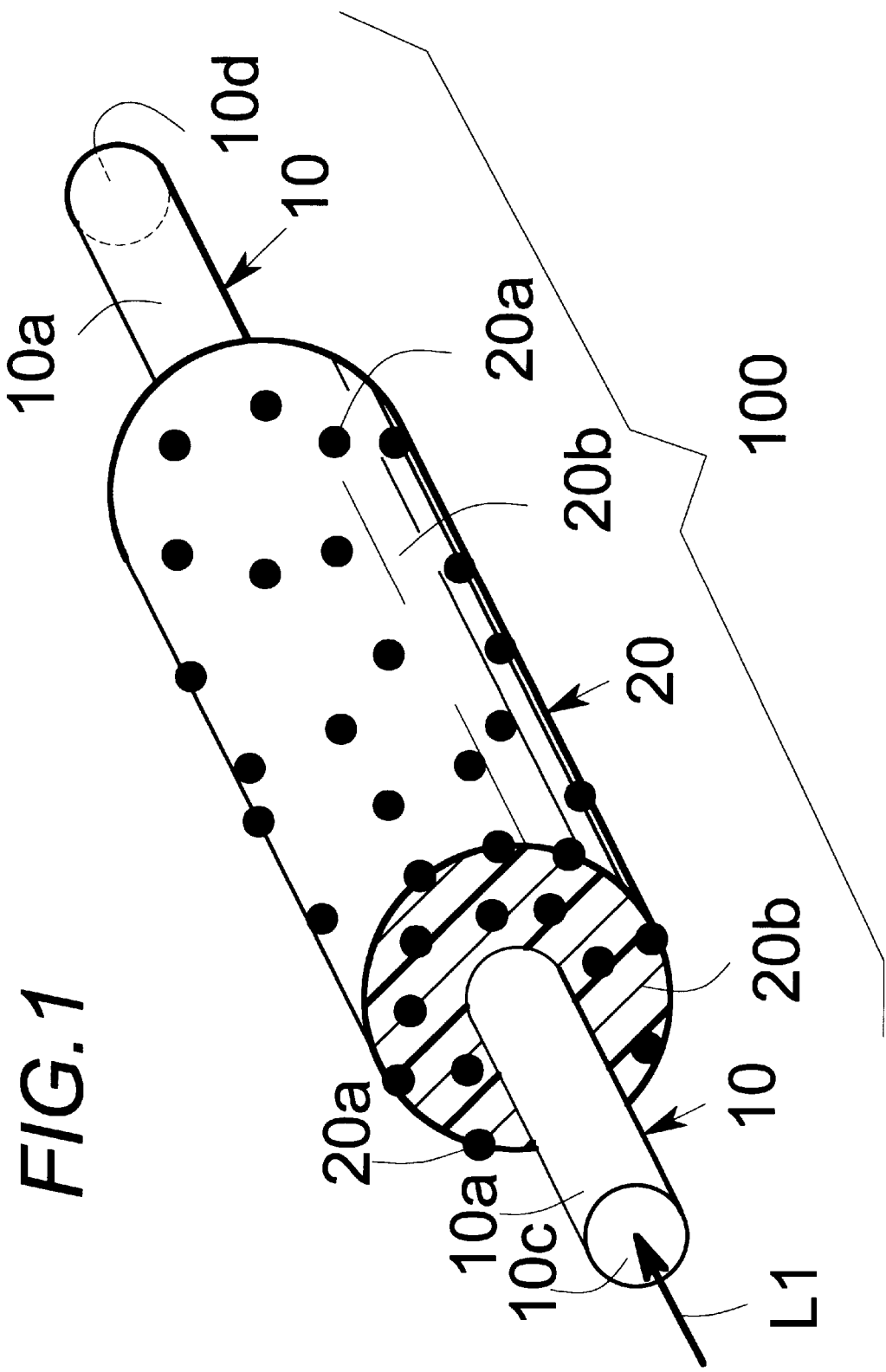
FIG. 1 is a conceptual perspective view of a preferred basic embodiment of the present invention, showing a photocatalyst optical fiber.

The present invention will now be described in detail with reference to the drawings.

In the drawings, a relative dimension or size of each part or portion is shown as somewhat different one to clarify an explanation of the present invention and the same parts or portions have the same reference marks or numerals.

Reference is made to FIG. 1, FIG. 2, FIG. 3, and FIG. 4 showing preferred embodiments of the present invention.

As shown in FIG. 1, the photocatalyst optical fiber 100 is briefly composed of an optical fiber core 1, a surface 10a of the core 10, a light input end 10c (i.e. proximate end or face), a light output end 10d (i.e. distal end or face) and a photocatalyst layer or film 20 disposed on the surface 10a of the core 10. The core 10 may be made of transparent material capable of transmitting UV (ultraviolet) light rays. The photocatalyst layer 20 or film is corresponding to a clad (i.e. sheath) of a conventional optical fiber. The photocatalyst layer 20 may be composed of multiple photocatalyst particles 20a and a binder 20b capable of transmitting UV light rays. The photocatalyst particles 20a may be dispersed in the binder 20b.

The core 10 further may be made of UV transmitting inorganic material such as Fused Quarts (including more than 99.9 weight % of $SiO_2$), Sapphire, Borosilicate glass (composing of $SiO_2$; 75.3, $B_2O_3$; 13.8; ZnO; 1.4, $Al_2O_3$; 4.3, NaO; 5.0 weight %), etc. The core 10 may be made of organic material instead of the inorganic material such as Silicone resin (Dimethyl Silicone, etc.), Acrylic resin (Polymethyl Methacrylate, etc.), Polycarbonate resin (PC) and UV transmissible Fluoric resin (Polyfluoroethylene), Polyethylene resin, Polyester resin, etc.

The photocatalyst particles 20a may be photo-activated semiconductors such as Titanium Dioxide; $TiO_2$ (photo-activation wavelength; not more than 388 nm), Tungsten Dioxide; $WO_2$ (photo-activation wavelength; not more than 388 nm), Zinc Oxide; ZnO (photo-activation wavelength; not more than 388 nm), Zinc Sulfide; ZnS (photo-activation wavelength; not more than 344 nm) and Tin Dioxide $SnO_2$ photo-activation wavelength; not more than 326 nm).

The binder 20b or paint capable of transmitting the short wavelength rays L1 may be made of transparent organic material such as Silicone resin, Acrylic resin, Polycarbonate resin and UV transmissible Fluoric resin, etc. Alternatively, the binder 22 is made of inorganic material capable of transmitting the short wavelength rays L1 such as transparent glass flit.

Alternatively, the photocatalyst layer 20 may be made from Titania sol, which is preliminarily coated on the core 10 and treated by high temperature of about 500° C. then the Titania sol changes to Titanium Dioxide.

Therefore, when the UV light rays L1 emitting from a UV light source (not shown in the drawing) are projected to the terminal i.e. the light input end 10c of the photocatalyst optical fiber 100, the UV light rays L1 are transmitted to another terminal i.e. distal end 10d of the photocatalyst optical fiber 100 by carrying out multiple reflections i.e. by reflecting repeatedly inside of the core 10 and simultaneously the UV light rays L1 are leaking out from the core 10 to the photocatalyst layer 20 corresponding to the clad i.e. sheath to activate the photocatalyst particles 21, which are dispersed in the photocatalyst layer 20.

An object (i.e. substance) to be cleaned, or reacted, etc. which is contacted, closed to, or stuck on the photocatalyst layer 20 is subjected to be cleaned-up or processed to react for clarification by oxidation and/or reduction.

Figure 2:
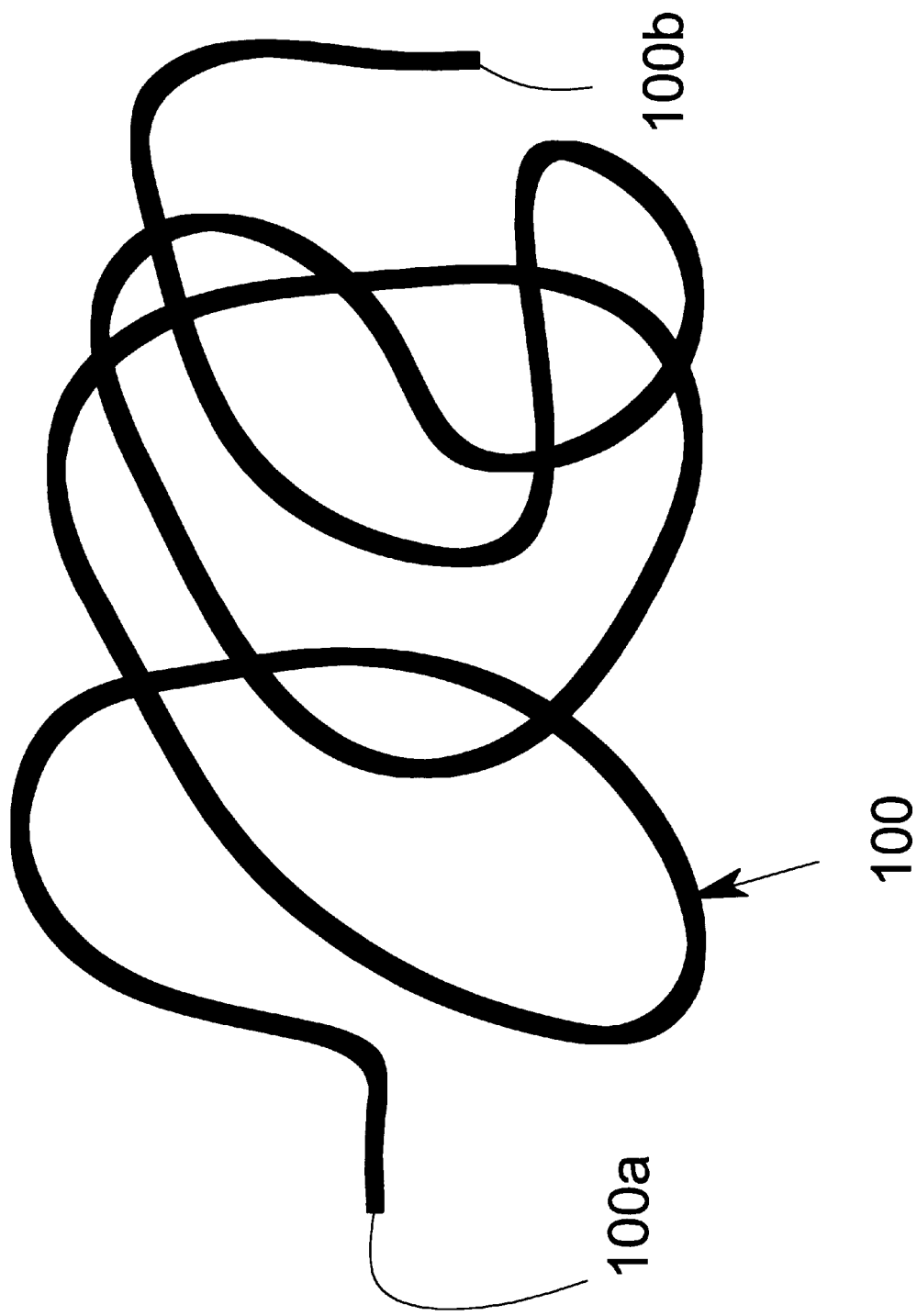
FIG. 2 is a schematic side elevational view of a modification of the preferred basic embodiment of FIG. 1, showing a photocatalyst optical fiber elongated randomly and continuously to form a nonlinear shape as a whole.
Figure 3:
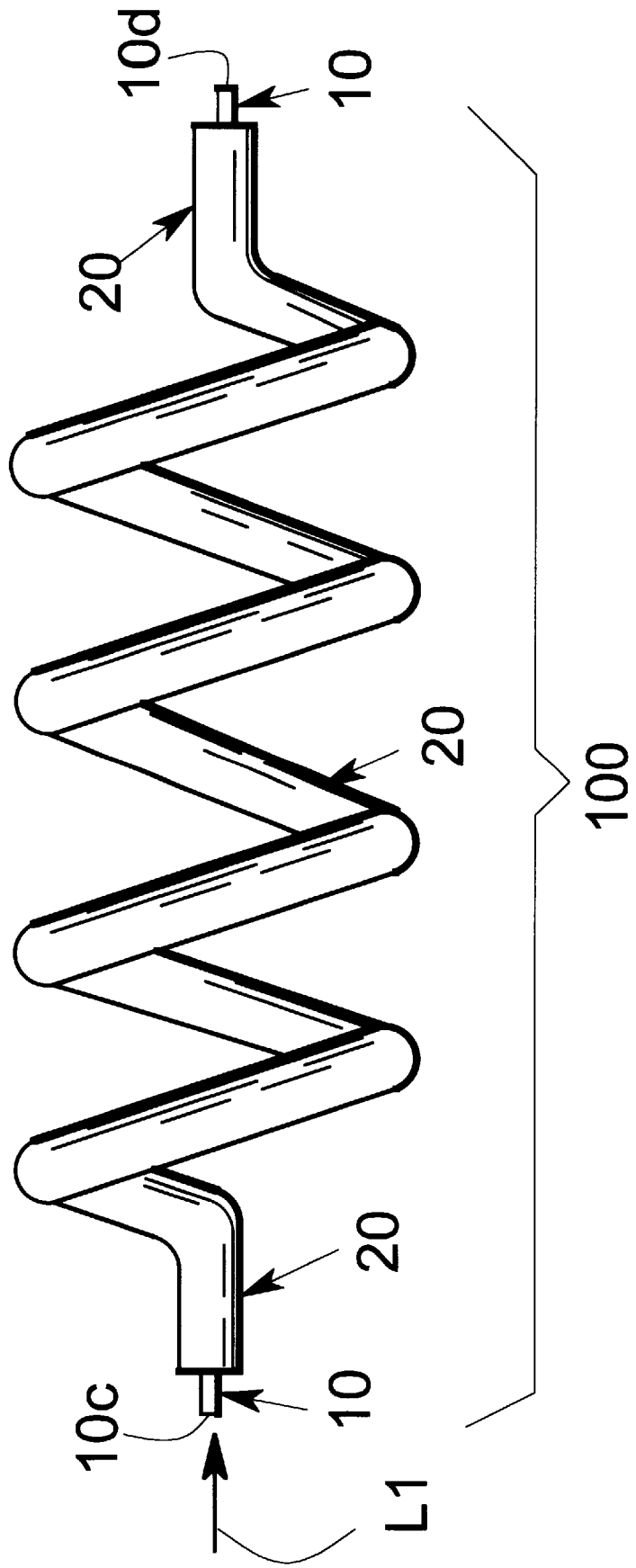
FIG. 3 is a schematic side elevational view of an another modification of the preferred basic embodiment of FIG. 1, showing a photocatalyst optical fiber elongated continuously to form a coil shape.
Figure 4:
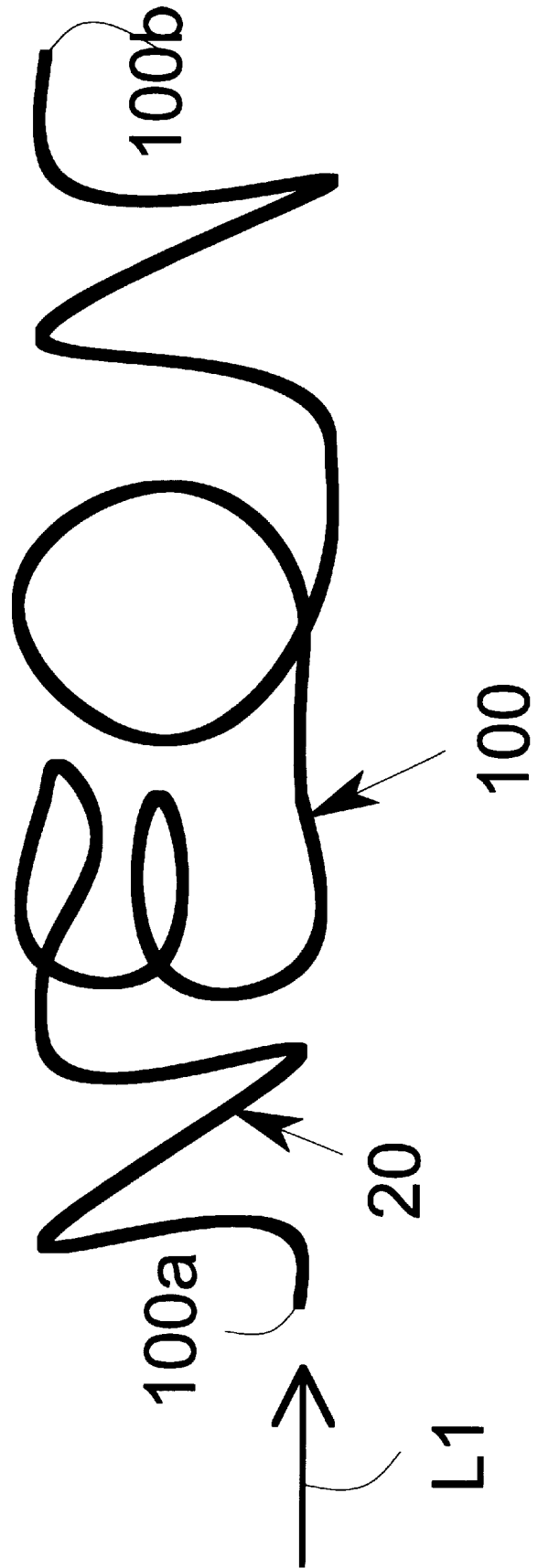
FIG. 4 is a schematic side elevational view of an still another modification of the preferred basic embodiment of FIG. 1, showing a photocatalyst optical fiber elongated continuously to form a character shape o.g. "NEON", as if the character was written in one stroke.

Reference is made to FIG. 2, FIG. 3 and FIG. 4, the photocatalyst optical fiber 100 may be arranged in any pattern (or a desired and/or predetermined pattern) such as a coil shape, a character shape, or a neon sign display.

That is, in FIG. 2, a modified preferred embodiment of the preferred basic embodiment of FIG. 1 of the present invention is shown in which a single long photocatalyst optical fiber 100 having basically the same structure as in FIG. 1 is elongated from a first end 100a to a second end 100b opposed to the first end 100a randomly and continuously to form a nonlinear shape as a whole. The nonlinear shape i.e. random shape may increase a surface area of the photocatalyst optical fiber 100 i.e. an exposed area of the photocatalyst layer 20 in a limited space.

In FIG. 3, an another modified preferred embodiment is shown in which a photocatalyst optical fiber 100 is composed of a core 10 (having a first end 10c, a second end 10d and a surface) and a photocatalyst layer 20 including photocatalyst similarly to the preferred basic embodiment of FIG. 1 of the present invention. And the photocatalyst optical fiber 100 in FIG. 3 is elongated from the first end 10c to the second end 10d is elongated continuously to form the above mentioned "coil shape" i.e. spring shape which is wound in a circle or a spiral.

In FIG. 4, a still another modified preferred embodiment is shown in which a photocatalyst optical fiber 100 is elongated from a first end 100*a* to a second end 100*b* to form the above mentioned "character shape" or "neon sign" like shape. For example, the photocatalyst optical fiber 100 in FIG. 2 is formed in the character shape as if a character o.g. "NEON" was written in one stroke, which acts as a display with a photocatalyst function.

The present invention has been disclosed in the publication of unexamined patent application of Japan, JP 9-225295 (Japanese Patent Application No. 8-080434) and the entire content of which is hereby incorporated by reference.

It is to be understood that the forgoing description is preferred embodiments of the present invention and the preferred embodiments is illustrative and not restrictive and that various changes, modifications, or equivalents may be made in the present invention without departing from the spirit and the scope of the present invention and the appended claims.

What is claimed is:

1. An optical fiber with photocatalyst comprising:

(b) an optical fiber core capable of transmitting light, wherein said light is introduced from a light input terminal end of said optical fiber said light reflects repeatedly inside of said optical fiber core;

(c) a photocatalyst layer film including photocatalyst supported on said optical fiber core; and (d) wherein said photocatalyst layer including photocatalyst includes photo-activated semiconductor material selected from the group consisting of Titanium Dioxide, Tungsten Dioxide, Zinc Oxide, Tin Dioxide and Zinc Oxide.

2. The photocatalyst optical fiber according to claim 1:

wherein said optical fiber is used for a device selected from the group consisting of a cleaning device to delete dirty component from surface of articles, a dirt protection device to prevent sticking of dirty component, an infection device, a deleting device of smell, a cleaning device of air, a processing device of exhausting gas, a cleaning device of water, a processing device of exhausting water, a dissolving device of water to make Hydrogen, a speeding up device of chemical reaction and a dissolving device of pollutant causing social pollution.

3. The optical fiber with photocatalyst according to claim 1:

wherein said photocatalyst layer including photocatalyst is composed of a plurality of photo-activated semiconductors and an organic binder made of Silicone resin, Acrylic resin, Polycarbonate resin or Fluoric resin, or an inorganic binder made of glass flit.

4. The optical fiber with photocatalyst according to claim 1:

wherein said photocatalyst layer including photocatalyst is composed of a plurality of photo-activated semiconductor particles and an organic or inorganic binder to bind or fix said photo-activated semiconductor particles on said core.

5. The optical fiber with photocatalyst according to claim 1:

wherein said core is made of organic material selected from the group consisting of Silicone resin, Acrylic resin, Polycarbonate resin and UV transmissible Fluoric resin, Polyethylene and Polyester resin.

6. The optical fiber with photocatalyst according to claim 1:

wherein said core is made of inorganic material selected from the group consisting of Fused Quarts, Sapphire and Borosilicate glass.

7. The optical fiber with photocatalyst according to claim 1:

wherein said optical fiber has a light transmission body corresponding to a core and a surface on said core;

wherein said optical fiber carries said photocatalyst layer corresponding to a clad on said surface; and wherein said photocatalyst layer is directly irradiated with light from an inside of said light transmission body.

8. The optical fiber with photocatalyst according to claim 1:

wherein said optical fiber is elongated to form a non-linear pattern as a whole; and wherein said non-linear pattern is selected from a group consisting of a random shape with one or more curvatures, a character like shape with one or more characters and a coil like shape with one or more windings.

9. The optical fiber with photocatalyst according to claim 1:

wherein said optical fiber is elongated to form a non-linear pattern as a whole; and wherein said non-linear pattern is a neon sign like display.

10. An optical fiber with photocatalyst comprising:

(a) an optical fiber core capable of transmitting light with short wavelength, wherein said light is introduced from a light input terminal end of said optical fiber core, said light reflects repeatedly inside of said optical fiber core and said light is leaked out gradually from said optical fiber core; and (b) a photocatalyst layer including photocatalyst supported on said optical fiber core, wherein said photocatalyst layer is activated by irradiation of said light.

11. The optical fiber with photocatalyst according to claim 10:

wherein said optical fiber core is made of inorganic material selected from the group consisting of Fused Quarts, Sapphire and Borosilicate glass.

12. The photocatalyst optical fiber according to claim 10:

wherein said photocatalyst layer is composed of a Titanium Oxide layer i.e. film disposed on said core made of inorganic material; and wherein said Titanium Dioxide layer is produced by firing a Titania Sol coating preliminarily coated on said optical fiber.

13. The optical fiber according to claim 10:

wherein said photocatalyst layer including photocatalyst includes photo-activated semiconductor material, selected from the group consisting of Titanium Dioxide, Tungsten Dioxide, Zinc Oxide, Tin Dioxide and Zinc Sulfide.

14. The optical fiber with photocatalyst according to claim 10:

wherein said photocatalyst layer including photocatalyst is composed of a plurality of photo-activated semiconductor particles selected from the group consisting of Titanium Dioxide, Tungsten Dioxide, Zinc Oxide, Tin Dioxide and Zinc Sulfide and an organic or inorganic binder to bind or fix said photo-activated semiconductor particles on said optical fiber core.

15. The optical fiber with photocatalyst according to claim 10:
   wherein said optical fiber has a light transmission body corresponding to a core and a surface on said core;
   wherein said optical fiber carries said photocatalyst layer corresponding to a clad on said surface; and
   wherein said photocatalyst layer is directly irradiated with light from an inside of said light transmission body.

16. The optical fiber with photocatalyst according to claim 10:
   wherein said light optical fiber core is made of organic material selected from the group consisting of Silicone resin, Acrylic resin, Polycarbonate resin and Fluoric resin, Polyethylene resin and Polyester resin.

17. The photocatalyst optical fiber according to claim 10:
   wherein said optical fiber is used for a device selected from the group consisting of a cleaning device to delete dirty component from surface of articles, a dirt protection device to prevent sticking of dirty component, an infection device, a deleting device of smell, a cleaning device of air, a processing device of exhausting gas, a cleaning device of water, a processing device of exhausting water, a dissolving device of water to make Hydrogen, a speeding up device of chemical reaction and a dissolving device of pollutant causing social pollution.

18. A method for activating photocatalyst comprising:
   (a) providing a photocatalyst layer film including photocatalyst, supported by an optical fiber capable of transmitting light;
   (b) introducing said light inside of said optical fiber;
   (c) letting said light to reflect repeatedly inside of said optical fiber; and,
   (d) letting said light to leak gradually from said optical fiber to said photocatalyst layer, thereby said photocatalyst layer is activated by irradiation of said light.

19. The method for activating Photocatalyst according to claim 18:
   wherein said optical fiber has a light transmission body corresponding to a core and a surface on said core;
   wherein said optical fiber carries said photocatalyst layer corresponding to a clad on said surface; and
   wherein said photocatalyst layer is directly irradiated with light from an inside of said light transmission body.

20. The method for activating photocatalyst according to claim 18:
   wherein said optical fiber is used for a method selected from the group consisting of a cleaning method to delete dirty component from surface of articles, a dirt protection method to prevent sticking of dirty component, an infection method, a deleting method of smell, a cleaning method of air, a processing method of exhausting gas, a cleaning method of water, a processing method of exhausting water, a dissolving method of water to make Hydrogen, a speeding up method of chemical reaction and a dissolving method of pollutant causing social pollution.

* * * * *